United States Patent
Yang et al.

(10) Patent No.: US 9,621,324 B2
(45) Date of Patent: Apr. 11, 2017

(54) METHOD AND DEVICE FOR TRANSMITTING UPLINK CONTROL INFORMATION, AND UE

(75) Inventors: Weiwei Yang, Shenzhen (CN); Bo Dai, Shenzhen (CN); Shuqiang Xia, Shenzhen (CN); Chunli Liang, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 325 days.

(21) Appl. No.: 14/354,353

(22) PCT Filed: Dec. 22, 2011

(86) PCT No.: PCT/CN2011/084474
§ 371 (c)(1),
(2), (4) Date: May 13, 2014

(87) PCT Pub. No.: WO2012/152012
PCT Pub. Date: Nov. 15, 2012

(65) Prior Publication Data
US 2014/0314034 A1     Oct. 23, 2014

(30) Foreign Application Priority Data
Sep. 30, 2011   (CN) .......................... 2011 1 0296344

(51) Int. Cl.
*H04L 5/00*   (2006.01)
*H04L 1/00*   (2006.01)
*H04L 1/16*   (2006.01)

(52) U.S. Cl.
CPC ............ *H04L 5/0055* (2013.01); *H04L 1/003* (2013.01); *H04L 1/0026* (2013.01);
(Continued)

(58) Field of Classification Search
CPC ................ H04L 1/00; H04L 1/16; H04L 5/00
See application file for complete search history.

(56) References Cited

U.S. PATENT DOCUMENTS

2009/0141690 A1   6/2009   Fan
2010/0278109 A1   11/2010  Papasakellariou et al.
(Continued)

FOREIGN PATENT DOCUMENTS

CN   101958774 A   1/2011
CN   102075293 A   5/2011
(Continued)

OTHER PUBLICATIONS

Supplementary European Search Report in European application No. 11865368.2, mailed on May 12, 2015.
(Continued)

*Primary Examiner* — Xavier Szewai Wong
(74) *Attorney, Agent, or Firm* — Oppedahl Patent Law Firm LLC

(57) ABSTRACT

The disclosure discloses a method and device for transmitting uplink control information. The method includes that: uplink control information to be transmitted is determined on the basis of high layer signalling and/or a predefined rule, and the determined uplink control information is transmitted on a Physical Uplink Control Channel (PUCCH). The device for transmitting uplink control information includes: a determining unit configured to determine, on the basis of high layer signalling and/or a predefined rule, uplink control information to be transmitted; and a transmitting unit configured to transmit, on the PUCCH, the determined uplink control information. The disclosure can ensure the maximum system throughput, and can also reduce the feedback delay of downlink channel information.

14 Claims, 8 Drawing Sheets

(52) U.S. Cl.
CPC .......... *H04L 1/0031* (2013.01); *H04L 1/0073* (2013.01); *H04L 1/0079* (2013.01); *H04L 1/1671* (2013.01)

(56) References Cited

U.S. PATENT DOCUMENTS

| | | | |
|---|---|---|---|
| 2010/0311431 A1* | 12/2010 | Papasakellariou | H04B 1/713 455/450 |
| 2011/0243066 A1 | 10/2011 | Nayeb Nazar | |
| 2011/0249578 A1* | 10/2011 | Nayeb Nazar | H04L 1/0027 370/252 |
| 2012/0210187 A1* | 8/2012 | Yin | H03M 13/136 714/751 |
| 2012/0320826 A1 | 12/2012 | Kim | |
| 2013/0051369 A1* | 2/2013 | Ko | H04B 7/0413 370/335 |
| 2013/0215807 A1* | 8/2013 | Yang | H04L 1/0026 370/281 |
| 2014/0016600 A1 | 1/2014 | Kim et al. | |
| 2014/0233517 A1* | 8/2014 | Seo | H04L 1/0026 370/329 |

FOREIGN PATENT DOCUMENTS

| | | |
|---|---|---|
| CN | 102098146 A | 6/2011 |
| CN | 102111849 A | 6/2011 |
| EP | 2547058 A2 | 1/2013 |
| WO | 2011041623 A1 | 4/2011 |
| WO | 2011085230 A2 | 7/2011 |
| WO | 2011112004 A2 | 9/2011 |

OTHER PUBLICATIONS

International Search Report in international application No. PCT/CN2011/084474, mailed on Jul. 5, 2012. (6 pages—see entire document).

English Translation of the Written Opinion of the International Search Authority in international application No. PCT/CN2011/084474, mailed on Jul. 5, 2012. (5 pages—see entire document).

* cited by examiner

METHOD AND DEVICE FOR TRANSMITTING UPLINK CONTROL INFORMATION, AND UE

TECHNICAL FIELD

The disclosure relates to technology of sending uplink control information, and in particular to a method and device for transmitting uplink control information, and a User Equipment (UE).

BACKGROUND

Radio frames in a Long Term Evolution (LTE) system and an LTE-Advanced (LTE-A) system include frame structures of a Frequency Division Duplexing (FDD) mode and a Time Division Duplexing (TDD) mode. FIG. 1 is a schematic diagram of a frame structure in an existing LTE/LTE-A FDD system. As shown in FIG. 1, one radio frame of 10 milliseconds (ms) is composed of twenty time slots each having a length of 0.5 ms and numbered from 0 to 19. The time slots $2i$ and $2i+1$ constitute a subframe i having a length of 1 ms. FIG. 2 is a schematic diagram of a frame structure in an existing LTE/LTE-A TDD system. As shown in FIG. 2, one radio frame of 10 ms is composed of two half frames each having a length of 5 ms. One half frame includes 5 subframes each having a length of 1 ms. The subframe i is defined as 2 time slots $2i$ and $2i+1$ each having a length of 0.5 ms respectively.

In the two kinds of frame structures above, for a Normal Cyclic Prefix, one time slot contains 7 symbols each having a length of 66.7 microseconds (μs). The CP length of the first symbol is 5.21 μs, and the length of each of the remaining 6 symbols is 4.69 μs. For an Extended Cyclic Prefix (Extended CP), one time slot contains 6 symbols, the CP length of each of which is 16.67 μs. The uplink/downlink configuration supported is as shown in Table 1:

TABLE 1

| Uplink-downlink configuration | Downlink-uplink switching point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in one radio frame, "D" represents a subframe dedicated to downlink transmission, "U" represents a subframe dedicated to uplink transmission, and "S" represents a special subframe, which contains a Downlink Pilot Time Slot (DwPTS), a Guard Period (GP) and an Uplink Pilot Time Slot (UpPTS).

The TDD supports uplink/downlink switching periods of 5 ms and 10 ms. If the downlink-to-uplink switching point period is 5 ms, the special subframe will be present in the two half frames. If the downlink-to-uplink switching point period is 10 ms, the special subframe is only present in the first half frame. Subframe 0 and subframe 5 as well as the DwPTS are always used for downlink transmission. The UpPTS and the subframe following the special subframe are dedicated to uplink transmission.

The LTE/LTE-A uplink adopts a way of Single Carrier-Frequency Division Multiple Access (SC-FDMA), and a symbol of an uplink time domain is an uplink SC-FDMA symbol.

The Uplink Control Information (UCI) includes a Scheduling Request (SR), Acknowledgement/Negative-Acknowledge (ACK/NACK) response information, and Channel State Information (CSI). The uplink control information may be sent on a Physical Uplink Control Channel (PUCCH), and may also be sent on a Physical Uplink Shared Channel (PUSCH). A PUCCH format supported in the LTE/LTE-A system is described briefly below.

The LTE system supports in total 6 PUCCH formats, which are format 1, format 1a, format 1b, and format 2, format 2a, format 2b respectively. The PUCCH format 1 is used for transmitting the SR, the format 1a/1b is used for transmitting a response signal (ACK/NACK) or for transmitting the response signal and the scheduling request simultaneously, and the PUCCH format 2/2a/2b is used for transmitting the CSI, or the CSI and the ACK/NACK response information. Each PUCCH channel occupies, in one subframe, resources of two physical resource blocks, and occupies, in one time slot, resources of one physical resource block. The PUCCH format 1/1a/1b has the same data-reference signal structure, while the PUCCH format 2/2a/2b also has the same data-reference signal structure.

The most prominent characteristic of the LTE-A system with respect to the LTE system is that carrier aggregation technology is introduced into the LTE-A system, that is, the bandwidth of the LTE system is aggregated to obtain a larger bandwidth. In the system into which the carrier aggregation is introduced, the carrier aggregated is referred to as a Component Carrier (CC), and is also referred to as a serving cell. Meanwhile, concepts for a Primary Component Carrier/Primary Cell (PCC/PCell) and a Secondary Component Carrier/Secondary Cell (SCC/SCell) are also proposed. In the system on which the carrier aggregation is performed, a primary serving cell and a secondary serving cell are at least included, wherein the primary serving cell is always in an activated state.

Since the LTE-A system introduces the carrier aggregation, when the carrier aggregation is adopted, the ACK/NACK response information that User Equipment (UE) needs to feed back will be increased correspondingly. The existing PUCCH formats for the LTE system can only support the feedback of at most 4 bits of ACK/NACK response information. In order to support the feedback of more (exceeding 4 bits) ACK/NACK response information, the LTE-A system introduces a new format, which is referred to as a PUCCH format 3. The channelization process of the PUCCH format 3 is as shown in FIG. 3. The channel structure of the PUCCH format 3 is as shown in FIG. 5. The PUCCH format 3 can support the feedback of at most 20 bits of ACK/NACK response information. Additionally, the PUCCH format 3 has two encoding schemes, for purpose of description, which are referred to as a single Reed-Muller (RM in short) code encoding scheme and a double RM code encoding scheme respectively. When the bits that needs to be fed back are less than or equal to 11 bits, the single RM code will be adopted, whereas when the bits fed back are greater than 11 bits and less than 22 bits, the double RM code will be adopted. The encoding processes in which the single RM code and the double RM code are adopted are as shown in FIG. 4(a) and FIG. 4(b), respectively.

As mentioned previously, the uplink control information that the UE needs to feed back includes 3 parts: an SR, an ACK/NACK response information, and periodic CSI. Since the UE needs to send the SR and the periodic CSI according to a certain period, and at the same time, according to the downlink scheduling, the UE also needs to feed back the ACK/NACK response information. Therefore, on a certain subframe, the UE needs to send multiple kinds of uplink control information simultaneously. When the UE needs to send the ACK/NACK response information and the periodic CSI on the same subframe, there are the following regulations for the existing LTE-A system:

When the ACK/NACK response information that the UE needs to feed back only corresponds to the ACK/NACK response information of the primary serving cell (Pcell), the UE sends the ACK/NACK response information and the periodic CSI by using the PUCCH format 2/2b. In other cases, the UE will discard the periodic CSI and only send the ACK/NACK response information.

The LTE-A system adopts the aforementioned method of multiplexing the uplink control information (the multiplexing here refers to sending two or more kinds of control information simultaneously), because its main goal is to ensure the performance of the downlink throughput. Moreover, in the typical application scenario of the LTE-A (Rel-10 phase), the number of serving cells participating the carrier aggregation is generally 2. Therefore, as long as the periodic CSI of the serving cell is configured appropriately, the probability that the periodic CSI and the ACK/NACK response information are sent on the same subframe may be controlled within a relatively low scope in conjunction with a certain scheduling limit. Thus, the influence on the performance of the system resulting from discarding the periodic CSI is acceptable.

But in the subsequent releases (such as Rel-11) after the Rel-10, the typical application scenario of the carrier aggregation is not limited to 2 serving cells again. With the increase in the number of the serving cells, the probability that the periodic CSI and the ACK/NACK response information collide on the same subframe will increase therewith. If the method of Rel-10 is still adopted, i.e., the periodic CSI is discarded as long as the ACK/NACK response information corresponds to the secondary serving cell, then the accuracy of the CSI obtained on a base station side will decrease, thereby influencing the performance of the downlink throughput.

The existing solution that is not adopted by the LTE-A system is that: the periodic CSI and the ACK/NACK response information are sent simultaneously by using the PUCCH format 3. Specifically, there are the following specific forms:

(1) the periodic CSI and the ACK/NACK response information are encoded in the manner of joint encoding, and the encoded bits are sent by using the PUCCH format 3 after being modulated; and (2) the periodic CSI and the ACK/NACK response information are subjected to RM encoding and modulation respectively in the encoding way of double RM code, and then sent by using the PUCCH format 3.

However, the above schemes do not consider different error code performance requirements of the ACK/NACK response information and the periodic CSI as well as the importance of the ACK/NACK response information. Thus, when there are more bits of the ACK/NACK response information that needs to be fed back, it is difficult to ensure the performance of the ACK/NACK response information.

Therefore, it is necessary to consider a new scheme for transmitting the ACK/NACK response information and the periodic CSI, which can ensure that the ACK/NACK response information and the periodic CSI are sent simultaneously, and can compromise the detection performance of the ACK/NACK response information and the periodic CSI, thereby ensuring the maximum system throughput and reducing the feedback delay of downlink channel information.

SUMMARY

In view of the above, the disclosure is to provide a method and device for transmitting uplink control information, and a UE, which can send an ACK/NACK response information and periodic CSI simultaneously and can ensure the detection performance of the ACK/NACK response information and the periodic CSI.

To this end, the technical solutions of the disclosure are implemented as followings.

A method for transmitting uplink control information includes:

uplink control information to be transmitted is determined on the basis of high layer signalling and/or a predefined rule, and the determined uplink control information is transmitted on a Physical Uplink Control Channel (PUCCH).

Preferably, the process that the uplink control information to be transmitted is determined on the basis of the high layer signalling may include:

when the high layer signalling indicates that the uplink control information to be transmitted is Acknowledgement/Negative-Acknowledgement (ACK/NACK) response information and Channel State Information (CSI), the uplink control information to be transmitted is determined as ACK/NACK response information and CSI, or when the high layer signalling indicates that the uplink control information to be transmitted is the ACK/NACK response information, the uplink control information to be transmitted is determined as ACK/NACK response information.

Preferably, the process that the uplink control information to be transmitted is determined on the basis of the predefined rule may include:

the uplink control information to be transmitted is determined on the basis of at least one of the following rules:

Rule I: when a sum of the number of bits of the ACK/NACK response information and the number of bits of the CSI is greater than or equal to a preset threshold value, it is determined that the uplink control information to be transmitted is the ACK/NACK response information, and when the sum of the number of bits of the ACK/NACK response information and the number of bits of the CSI is less than the preset threshold value, it is determined that the uplink control information to be transmitted is the ACK/NACK response information and the CSI;

Rule II: when the number of bits of the ACK/NACK response information is greater than the number of bits of the CSI, it is determined that the uplink control information to be transmitted is the ACK/NACK response information, and when the number of bits of the ACK/NACK response information is less than or equal to the number of bits of the CSI, it is determined that the uplink control information to be transmitted is the ACK/NACK response information and the CSI;

Rule III: when a ratio of the number of bits of the ACK/NACK response information to the number of bits of the CSI is greater than or equal to a preset threshold value, it is determined that the uplink control information to be transmitted is the ACK/NACK response information, and when the ratio of the number of bits of the ACK/NACK response information to the number of bits of the CSI is less than the preset threshold value, it is determined that the uplink control information to be transmitted is the ACK/NACK response information and the CSI;

Rule IV: when the number of bits of the CSI is greater than or equal to a preset threshold value, it is determined that the uplink control information to be transmitted is the ACK/NACK response information, and when the number of bits of the CSI is less than the preset threshold value, it is determined that the uplink control information to be transmitted is the ACK/NACK response information and the CSI; and Rule V: when the number of bits of the ACK/NACK response information is greater than or equal to a preset threshold value, it is determined that the uplink control information to be transmitted is the ACK/NACK response information, and when the number of bits of the ACK/NACK response information is less than the preset threshold value, it is determined that the uplink control information to be transmitted is the ACK/NACK response information and the CSI.

Preferably, the process that the uplink control information to be transmitted is determined on the basis of the high layer signalling and the predefined rule may include:

when it is determined, on the basis of an indication of the high layer signalling, that the uplink control information to be transmitted is the ACK/NACK response information and the CSI, it is further determined, on the basis of the predefined rule, whether both the ACK/NACK response information and the CSI are to be transmitted simultaneously or only the ACK/NACK response information is to be transmitted.

Preferably, the process that the determined uplink control information is transmitted on the PUCCH may include:

the determined uplink control information to be transmitted on the PUCCH is encoded by a number P of Reed-Muller (RM) codes; and the encoded uplink control information on the PUCCH.

Preferably, the process that the encoded uplink control information on the PUCCH may include:

when the determined uplink control information is the ACK/NACK response information and the CSI, an input sequence of the P RM codes is determined in one of the following ways:

Way I: the bits of the ACK/NACK response information and the bits of the CSI are cascaded and then equally divided into P sequences, each sequence being taken as an input of a respective one of the P RM codes;

Way II: the bits of the ACK/NACK response information are taken as an input of P minus Q (P–Q) RM codes, and the bits of the CSI are taken as an input of Q RM codes; and Way III: when the number of bits of the ACK/NACK response information is greater than the number of bits of the CSI, the determined uplink control information is transmitted in the Way I; and when the number of bits of the ACK/NACK response information is less than the number of bits of the CSI, the determined uplink control information is transmitted in the Way II.

Preferably, the process that the encoded uplink control information on the PUCCH may include:

when the determined uplink control information is the ACK/NACK response information, an input sequence of the P RM codes is determined in one of the following ways:

Way I: the bits of the ACK/NACK response information are taken as an input of the P RM codes;

Way II: the bits of the ACK/NACK response information are equally divided into P sequences, each sequence being taken as an input of a respective one of the P RM codes; and Way III: ACK/NACK response information corresponding to a Physical Downlink Shared Channel (PDSCH) and/or Semi-Persistent Scheduling (SPS) release and/or an SPS PDSCH on a Primary Cell (Pcell) is taken as an input of Z RM codes, and the remaining ACK/NACK response information is equally divided into P–Z sequences, each sequence being taken as an input of a respective one of the P–Z RM codes.

Preferably, P may be a positive integer greater than 1, and Z and Q may be less than P and be a preset value, respectively.

A device for transmitting uplink control information includes a determining unit and a transmitting unit, wherein:

the determining unit is configured to determine, on the basis of high layer signalling and/or a predefined rule, uplink control information to be transmitted; and the transmitting unit is configured to transmit, on a Physical Uplink Control Channel (PUCCH), the determined uplink control information.

Preferably, the high layer signalling may be configured to indicate that the uplink control information to be transmitted is Acknowledgement/Negative-Acknowledgement (ACK/NACK) response information and Channel State Information (CSI), or the ACK/NACK response information.

Preferably, the determining unit may be further configured to determine the uplink control information to be transmitted on the basis of at least one of the following rules:

Rule I: when a sum of the number of bits of the ACK/NACK response information and the number of bits of the CSI is greater than or equal to a preset threshold value, it is determined that the uplink control information to be transmitted is the ACK/NACK response information, and when the sum of the number of bits of the ACK/NACK response information and the number of bits of the CSI is less than the preset threshold value, it is determined that the uplink control information to be transmitted is the ACK/NACK response information and the CSI;

Rule II: when the number of bits of the ACK/NACK response information is greater than the number of bits of the CSI, it is determined that the uplink control information to be transmitted is the ACK/NACK response information, and when the number of bits of the ACK/NACK response information is less than or equal to the number of bits of the CSI, it is determined that the uplink control information to be transmitted is the ACK/NACK response information and the CSI;

Rule III: when a ratio of the number of bits of the ACK/NACK response information to the number of bits of the CSI is greater than or equal to a preset threshold value, it is determined that the uplink control information to be transmitted is the ACK/NACK response information, and when the ratio of the number of bits of the ACK/NACK response information to the number of bits of the CSI is less than the preset threshold value, it is determined that the uplink control information to be transmitted is the ACK/NACK response information and the CSI;

Rule IV: when the number of bits of the CSI is greater than or equal to a preset threshold value, it is determined that the uplink control information to be transmitted is the ACK/NACK response information, and when the number of bits of the CSI is less than the preset threshold value, it is determined that the uplink control information to be transmitted is the ACK/NACK response information and the CSI; and Rule V: when the number of bits of the ACK/NACK response information is greater than or equal to a preset threshold value, it is determined that the uplink control information to be transmitted is the ACK/NACK response information, and when the number of bits of the ACK/NACK response information is less than the preset threshold value, it is determined that the uplink control information to be transmitted is the ACK/NACK response information and the CSI.

Preferably, the determining unit may be further configured to, when determining, on the basis of an indication of the high layer signalling, that the uplink control information to be transmitted is the ACK/NACK response information and the CSI, further determine, on the basis of the predefined rule, whether both the ACK/NACK response information and the CSI are to be transmitted simultaneously or only the ACK/NACK response information is to be transmitted.

Preferably, the transmitting unit may be further configured to transmit, on the PUCCH, the determined uplink control information which is encoded by Reed Muller (RM) codes.

Preferably, the transmitting unit may be further configured to transmit the determined uplink control information which is encoded by RM codes:

when the determined uplink control information is the ACK/NACK response information and the CSI, an input sequence of the P RM codes is determined in one of the following ways:

Way I: the bits of the ACK/NACK response information and the bits of the CSI are cascaded and then equally divided into P sequences, each sequence being taken as an input of a respective one of the P RM codes;

Way II: the bits of the ACK/NACK response information are taken as an input of P minus Q (P–Q) RM codes, and the bits of the CSI are taken as an input of Q RM codes; and Way III: when the number of bits of the ACK/NACK response information is greater than the number of bits of the CSI, the determined uplink control information is transmitted in the Way I; and when the number of bits of the ACK/NACK response information is less than the number of bits of the CSI, the determined uplink control information is transmitted in the Way II; and when the determined uplink control information is the ACK/NACK response information, an input sequence of the P RM codes is determined in one of the following ways:

Way I: the bits of the ACK/NACK response information are taken as an input of the P RM codes;

Way II: the bits of the ACK/NACK response information are equally divided into P sequences, each sequence being taken as an input of a respective one of the P RM codes; and Way III: ACK/NACK response information corresponding to a PDSCH and/or SPS release and/or an SPS PDSCH on a Primary Cell (Pcell) is taken as an input of Z RM codes, and the remaining ACK/NACK response information is equally divided into P minus Z (P–Z) sequences, each sequence being taken as an input of a respective one of the P–Z RM codes.

Preferably, P may be a positive integer greater than 1, and Z and Q may be less than P and be preset values.

A UE includes the aforementioned device for transmitting uplink control information.

In the disclosure, it is first determined, on the basis of high layer signalling and/or the predefined rule, whether only the ACK/NACK response information in the uplink control information is transmitted or both the ACK/NACK response information and the CSI are transmitted simultaneously, and according to different uplink control information to be transmitted, the uplink control information is transmitted respectively in a different encoding way of RM codes, thereby being capable of ensuring the maximum system throughput and reducing the feedback delay of downlink channel information. The disclosure improves the sending performance of the uplink control information, and improves the overall performance of the communication system.

DETAILED DESCRIPTION

Figure 1:
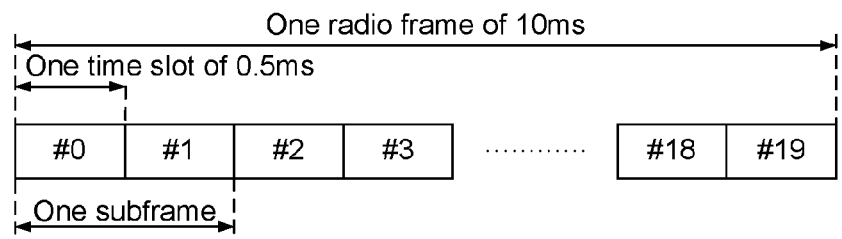
FIG. 1 is a schematic diagram of a frame structure of an FDD system in the prior art.
Figure 2:
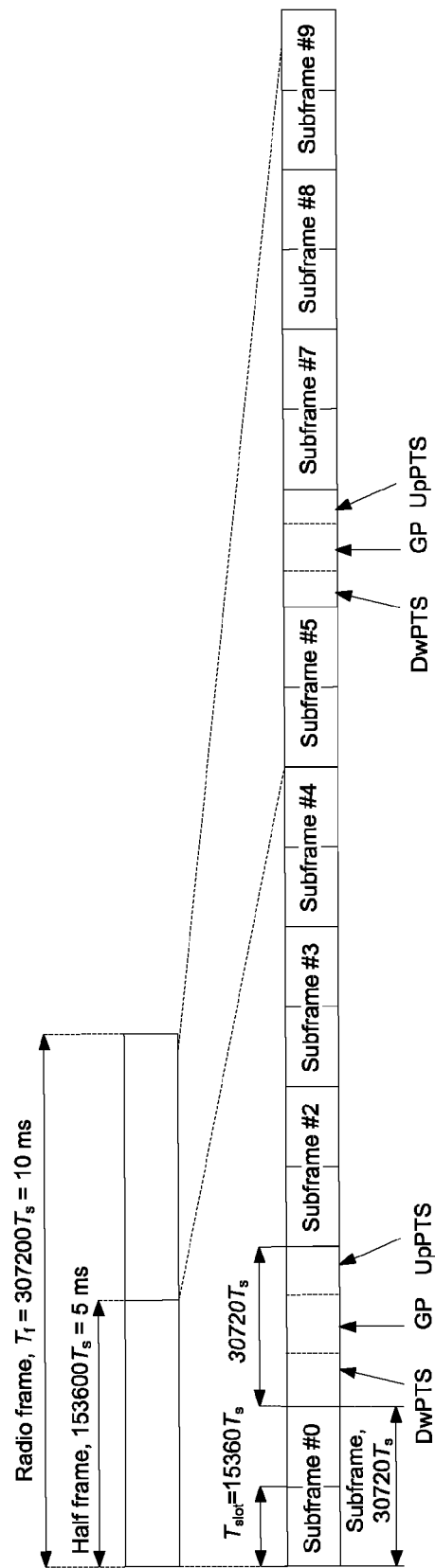
FIG. 2 is a schematic diagram of a frame structure of a TDD system in the prior art.
Figure 3:
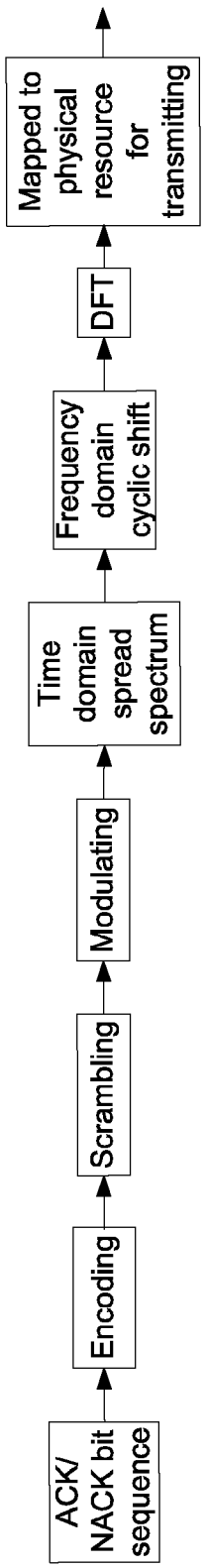
FIG. 3 is a schematic diagram of a channelization process of a PUCCH format 3.

The basic idea of the disclosure is that: it is first determined, on the basis of high layer signalling and/or a predefined rule, whether only the ACK/NACK response information in the uplink control information is transmitted or both the ACK/NACK response information and the CSI are transmitted simultaneously, thereby being capable of ensuring the maximum system throughput, and also being capable of reducing the feedback delay of downlink channel information.

In the disclosure, the UE determines, on the basis of the high layer signalling and/or the predefined rule, the specific uplink control information to be transmitted, and transmits the determined uplink control information on the PUCCH. The specific ways are as follows:

Way I when the high layer signalling indicates that the uplink control information to be transmitted is Acknowledgement/Negative-Acknowledgement (ACK/NACK) response information and Channel State Information (CSI), the uplink control information to be transmitted is determined as ACK/NACK response information and CSI, or when the high layer signalling indicates that the uplink control information to be transmitted is the ACK/NACK response information, the uplink control information to be transmitted is determined as ACK/NACK response information.

Way II

The UE determines, on the basis of one of the following rules or combination thereof, the uplink control information to be transmitted:

Rule I: when the sum of the number M of bits of the ACK/NACK response information and the number N of bits of the CSI is greater than or equal to a preset threshold value X1, it is determined that the uplink control information to be transmitted is the ACK/NACK response information, and when the sum of the number M of bits of the ACK/NACK response information and the number N of bits of the CSI is less than the preset threshold value X1, it is determined that the uplink control information to be transmitted is the ACK/NACK response information and the CSI;

Rule II: when the number M of bits of the ACK/NACK response information is greater than the number N of bits of the CSI, it is determined that the uplink control information that needs to be transmitted is the ACK/NACK response information, and when the number M of bits of the ACK/NACK response information is less than or equal to the number N of bits of the CSI, it is determined that the uplink control information to be transmitted is the ACK/NACK response information and the CSI;

Rule III: when the ratio of the number M of bits of the ACK/NACK response information to the number N of bits of the CSI is greater than or equal to a preset threshold value X2, it is determined that the uplink control information to be transmitted is the ACK/NACK response information, and when the ratio of the number M of bits of the ACK/NACK response information to the number N of bits of the CSI is less than the preset threshold value X2, it is determined that the uplink control information to be transmitted is the ACK/NACK response information and the CSI;

Rule IV: when the number N of bits of the CSI is greater than or equal to a preset threshold value X3, it is determined that the uplink control information to be transmitted is the ACK/NACK response information, and when the number N of bits of the CSI is less than the preset threshold value X3, it is determined that the uplink control information to be transmitted is the ACK/NACK response information and the CSI; and Rule V: when the number of bits of the ACK/NACK response information is greater than or equal to a preset threshold value, it is determined that the uplink control information to be transmitted is the ACK/NACK response information, and when the number of bits of the ACK/NACK response information is less than the preset threshold value, it is determined that the uplink control information to be transmitted is the ACK/NACK response information and the CSI.

That the uplink control information to be transmitted is the ACK/NACK response information refers to that only the ACK/NACK response information is transmitted and the CSI is discarded.

Way III

First, it is indicated, on the basis of the high layer signalling, that the uplink control information to be transmitted is the ACK/NACK response information and the CSI, or the ACK/NACK response information;

when the ACK/NACK response information and the CSI are transmitted simultaneously, it is further determined, on the basis of the predefined rule, whether both the ACK/NACK response information and the CSI are transmitted simultaneously or only the ACK/NACK response information is transmitted and the CSI is discarded;

In the disclosure, the PUCCH transmits, by using the structure of P RM codes, the determined uplink control information. When the determined uplink control information is the ACK/NACK response information and the CSI, the input sequence of the P RM codes is determined in one of the following ways:

Way I: M bits of the ACK/NACK response information and N bits of the CSI are cascaded and then equally divided into P sequences, each sequence being taken as an input of a respective one of the P RM codes;

Way II: M bits of the ACK/NACK response information is taken as an input of P–Q RM codes, and N bits of the CSI are taken as an input of Q RM codes; and Way III: if the number M of bits of the ACK/NACK response information is greater than the number N of bits of the CSI, the determined uplink control information is transmitted in the Way I; if the number M of bits of the ACK/NACK response information is less than the number N of bits of the CSI, the determined uplink control information is transmitted in the Way II.

In the disclosure, the PUCCH transmits, by using the structure of P RM codes, the determined uplink control information. When the determined uplink control information is the ACK/NACK response information, the input sequence of the P RM codes is determined in one of the following ways:

Way I: M bits of the ACK/NACK response information are taken as an input of the P RM codes;

Way II: M bits of the ACK/NACK response information are equally divided into P sequences, each sequence being taken as an input of a respective one of the P RM codes; and Way III: H pieces of ACK/NACK response information corresponding to a Physical Downlink Shared Channel (PDSCH) and/or a PDCCH used for indicating SPS release and/or an SPS PDSCH on a Pcell is taken as an input of Z RM codes, and the remaining M-H pieces of ACK/NACK response information is equally divided into P–Z sequences, each sequence being taken as an input of a respective one of the P–Z RM codes.

P is a positive integer greater than 1. The specific value of P is relevant to the PUCCH structure. The PUCCH structure decides the length Y of the sequence after P RM codes are encoded. The length L of the sequence after each RM code is encoded is Y/P. But the values of Z and Q are less than P and preset. The threshold values X1, X2, X3 above are positive integers greater than 1 and preset.

In order to make the purposes, technical solutions and advantages of the disclosure more clear, the disclosure is further elaborated below by means of embodiments and with reference to the accompanying drawings.

In the disclosure, the application scenario is that within any one subframe, it is necessary to send the ACK/NACK response information $\{o_0^{ACK}, o_1^{ACK}, \ldots, o_M^{ACK}\}$ and the CSI $\{o_0^{CSI}, o_1^{CSI}, \ldots, o_N^{CSI}\}$ simultaneously on the PUCCH. In the disclosure, when the ACK/NACK response information $\{o_0^{ACK}, o_1^{ACK}, \ldots, o_M^{ACK}\}$ and the CSI $\{o_0^{CSI}, o_1^{CSI}, \ldots, o_N^{CSI}\}$ are sent, it is necessary to determine, according to the bits of the ACK/NACK response information and the bits of the CSI in the uplink control information, whether the uplink control information to be sent is both the ACK/NACK response information $\{o_0^{ACK}, o_1^{ACK}, \ldots, o_M^{ACK}\}$ and the CSI $\{o_0^{CSI}, o_1^{CSI}, \ldots, o_N^{CSI}\}$, or only the ACK/NACK response information to $\{o_0^{ACK}, o_1^{ACK}, \ldots, o_M^{ACK}\}$.

Figure 8:
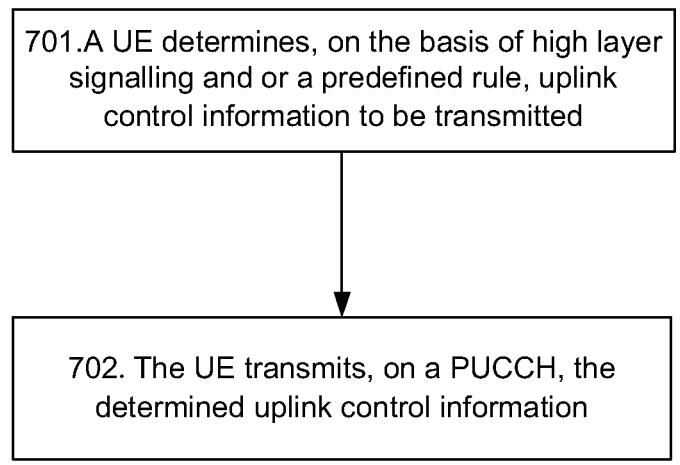
FIG. 8 is a flow chart of a method for transmitting uplink control information according to an embodiment of the disclosure.

FIG. 8 is a flow chart of a method for transmitting uplink control information according to an embodiment of the disclosure. As shown in FIG. 8, the method for transmitting uplink control information according to the embodiment of the disclosure includes the following steps:

Step 802: The UE determines, on the basis of high layer signalling and/or a predefined rule, the uplink control information to be transmitted; and Step 804: The UE transmits, on the PUCCH, the determined uplink control information.

In Step 802, that the UE determines, on the basis of the high layer signalling, the uplink control information to be transmitted refers to that: it is indicated explicitly in the high layer signalling that the uplink control information to be transmitted is the ACK/NACK response information $\{o_0^{ACK}, o_1^{ACK}, \ldots, o_M^{ACK}\}$ and the CSI $\{o_0^{CSI}, o_1^{CSI}, \ldots, o_N^{CSI}\}$, or the ACK/NACK response information $\{o_0^{ACK}, o_1^{ACK}, \ldots, o_M^{ACK}\}$.

In Step 802, that the UE determines, on the basis of the predefined rule, the uplink control information to be transmitted refers to that: the UE determines, on the basis of one of the following five rules or combination therefore, the uplink control information to be transmitted:

Rule I: when the sum of the number M of bits of the ACK/NACK response information and the number N of bits of the CSI is greater than or equal to a preset threshold value X1, it is determined that the uplink control information to be transmitted is the ACK/NACK response information $\{o_0^{ACK}, o_1^{ACK}, \ldots, o_M^{ACK}\}$, and when the sum of the number M of bits of the ACK/NACK response information and the number N of bits of the CSI is less than the preset threshold value X1, it is determined that the uplink control information to be transmitted is the ACK/NACK response information $\{o_0^{ACK}, o_1^{ACK}, \ldots, o_M^{ACK}\}$ and the CSI $\{o_0^{CSI}, o_1^{CSI}, \ldots, o_N^{CSI}\}$;

Rule II: when the number M of bits of the ACK/NACK response information is greater than the number N of bits of the CSI, it is determined that the uplink control information that needs to be transmitted is the ACK/NACK response information $\{o_0^{ACK}, o_1^{ACK}, \ldots, o_M^{ACK}\}$, and when the number M of bits of the ACK/NACK response information is less than or equal to the number N of bits of the CSI, it is determined that the uplink control information to be transmitted is the ACK/NACK response information $\{o_0^{ACK}, o_1^{ACK}, \ldots, o_M^{ACK}\}$ and the CSI $\{o_0^{CSI}, o_1^{CSI}, \ldots, o_N^{CSI}\}$;

Rule III: when the ratio of the number M of bits of the ACK/NACK response information to the number N of bits of the CSI is greater than or equal to a preset threshold value X2, it is determined that the uplink control information to be transmitted is the ACK/NACK response information, and when the ratio of the number M of bits of the ACK/NACK response information to the number N of bits of the CSI is less than the preset threshold value X2, it is determined that the uplink control information to be transmitted is the ACK/NACK response information and the CSI;

Rule IV: when the number N of bits of the CSI is greater than or equal to a preset threshold value X3, it is determined that the uplink control information to be transmitted is the ACK/NACK response information, and when the number N of bits of the CSI is less than the preset threshold value X3, it is determined that the uplink control information to be transmitted is the ACK/NACK response information and the CSI; and Rule V: when the number of bits of the ACK/NACK response information is greater than or equal to a preset threshold value X4, it is determined that the uplink control information to be transmitted is the ACK/NACK response information, and when the number of bits of the ACK/NACK response information is less than the preset threshold value X4, it is determined that the uplink control information to be transmitted is the ACK/NACK response information and the CSI.

All of the threshold values X1, X2, X3, and X4 are integers greater than 1, and are preset. Specifically, the specific values of X1, X2, X3 and X4 may be determined according to the characteristics of a communication system that the UE accesses. All of the X1, X2, X3 and X4 above are empirical values. It is easy to implement setting of these values.

In Step 804, that the UE transmits, on the PUCCH, the determined uplink control information refers to that: the PUCCH transmits, by using the structure of P RM codes, the determined uplink control information.

Specifically, when the determined uplink control information is the ACK/NACK response information and the CSI, the input sequence of P RM (L, O) is determined in one of the following ways:

Way I: The ACK/NACK response information bit sequence $\{o_0^{ACK}, o_1^{ACK}, \ldots, o_M^{ACK}\}$ and the CSI bit sequence $\{o_0^{CSI}, o_1^{CSI}, \ldots, o_N^{CSI}\}$ are cascaded and then equally divided into P sequences, and each sequence is taken as an input of each RM (L, O) code. The way of concatenating may be concatenating according to order, may also be concatenating according to parity, and may also be concatenating in an interweaving way. The way of equal division may be equal division according to order, and may also be equal division according to parity.

Example 1

Figure 4:
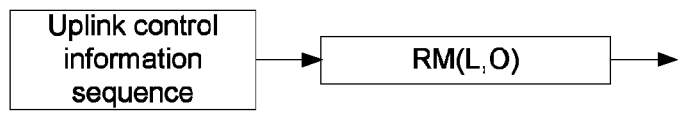
FIG. 4(a) is a schematic diagram of a single RM encoding process.
FIG. 4(b) is a schematic diagram of a double RM encoding process.
FIG. 4(c) is a schematic diagram of a triple RM encoding process.
FIG. 4(d) is a schematic diagram of a quadruple RM encoding process.
Figure 4:
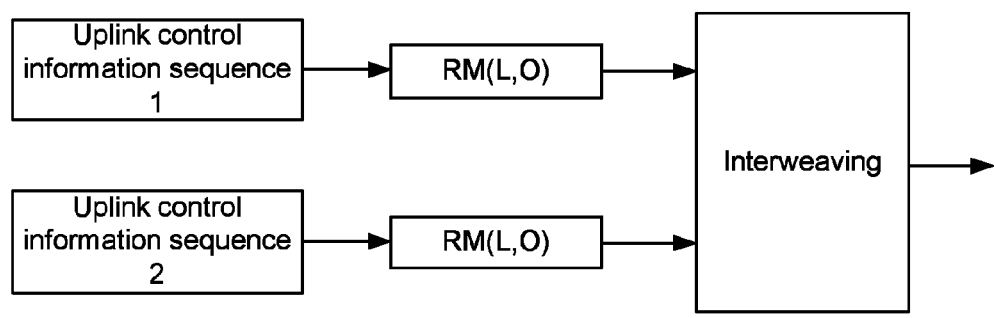
Figure 4:
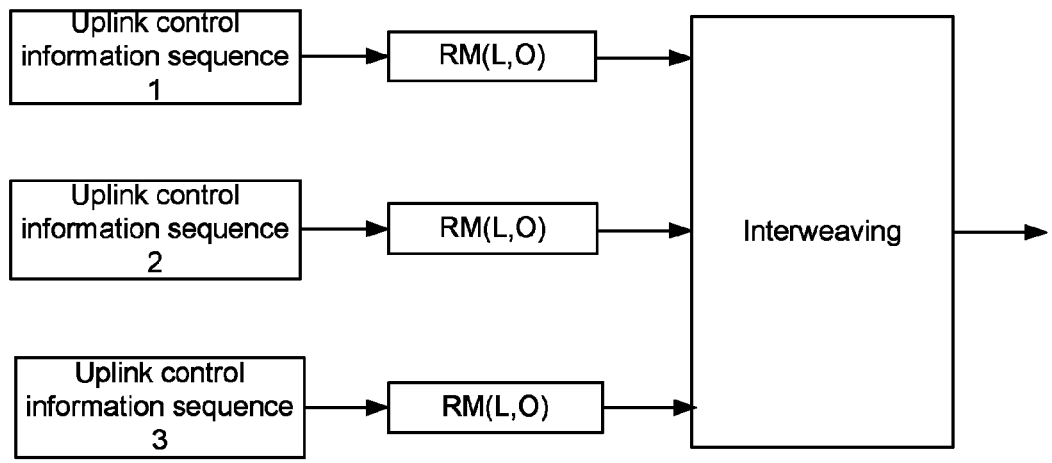
Figure 4:
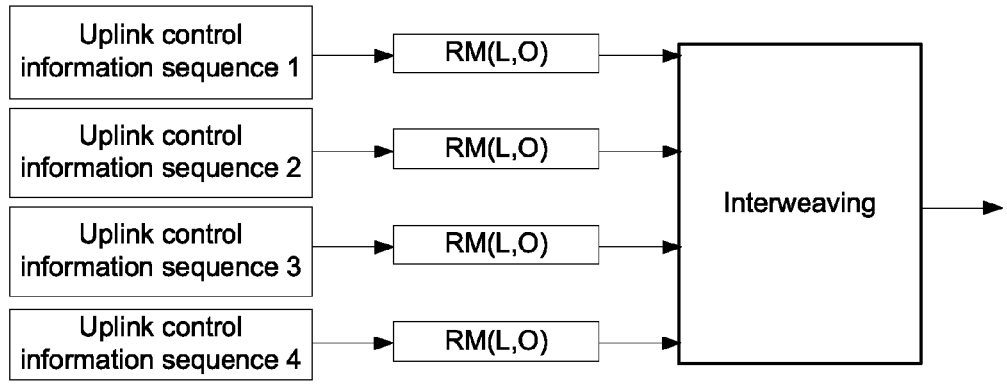
Figure 5:
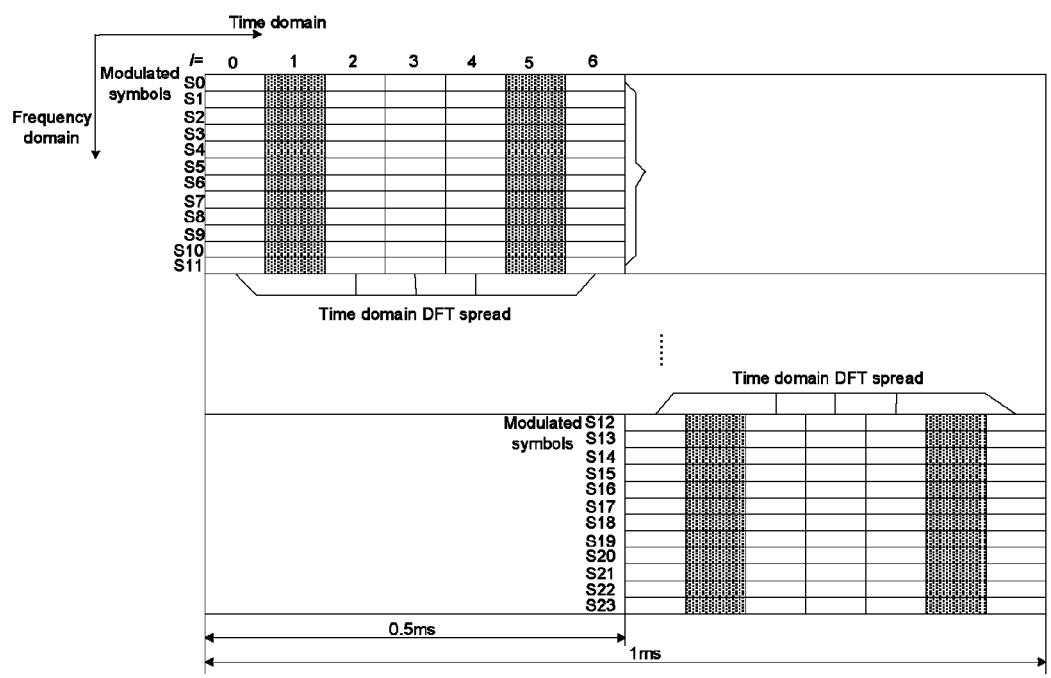
FIG. 5 is a schematic diagram of a channel structure of the PUCCH Format 3 under a conventional cyclic prefix.

As shown in FIG. 5, under a conventional CP, the uplink control information is transmitted by using the PUCCH Format 3. The encoding way is as shown in FIG. 4(a). That is, P=1, the ACK/NACK response information bit sequence $\{o_0^{ACK}, o_1^{ACK}, \ldots, o_M^{ACK}\}$ and the CSI bit sequence $\{o_0^{CSI}, o_1^{CSI}, \ldots, o_N^{CSI}\}$ are concatenated. Since the length of the encoded bit sequence that can be born under the PUCCH format 3 is 48, it is encoded by using RM (48, O) encoding, wherein the RM (48, O) is obtained by performing rate matching on the RM (32, O).

Example 2

As shown in FIG. 5, under the conventional CP, the uplink control information is transmitted by using the PUCCH Format 3. The encoding process is as shown in FIG. 4(b). That is, P=2, the ACK/NACK response information bit sequence $\{o_0^{ACK}, o_1^{ACK}, \ldots, o_M^{ACK}\}$ and the CSI bit sequence $\{o_0^{CSI}, o_1^{CSI}, \ldots, o_N^{CSI}\}$ are cascaded and then equally divided into 2 sequences. The lengths of the 2 sequences are $O_1=\lceil(M+N)/2\rceil$ and $O_2=(M+N)-O_1$ respectively. Since the length of the encoded bit sequence that can be born under the PUCCH format 3 is 48, each sequence is encoded by using RM (24, O), wherein the RM (24, O) is obtained by performing rate matching on the RM (32, O).

Example 3

As shown in FIG. 5, under the conventional CP, the uplink control information is transmitted by using the PUCCH format 3. The encoding process is as shown in FIG. 4(c). That is, P=3, the ACK/NACK response information bit sequence $\{o_0^{ACK}, o_1^{ACK}, \ldots, o_M^{ACK}\}$ and the CSI bit sequence $\{o_0^{CSI}, o_1^{CSI}, \ldots, o_N^{CSI}\}$ are cascaded and then equally divided into 3 sequences. The lengths of the 3 sequences are $O_1 = \lceil (M+N)/3 \rceil$, $O_2 = \lceil ((m+N)-O_1)/2 \rceil$ and $O_3 = (M+N)-O_1-O_2$ respectively. Since the length of the encoded bit sequence that can be born under the PUCCH format 3 is 48, each sequence is encoded by using RM (16, O), wherein the RM (16, O) is obtained by performing rate matching on the RM (32, O).

Example 4

Figure 6:
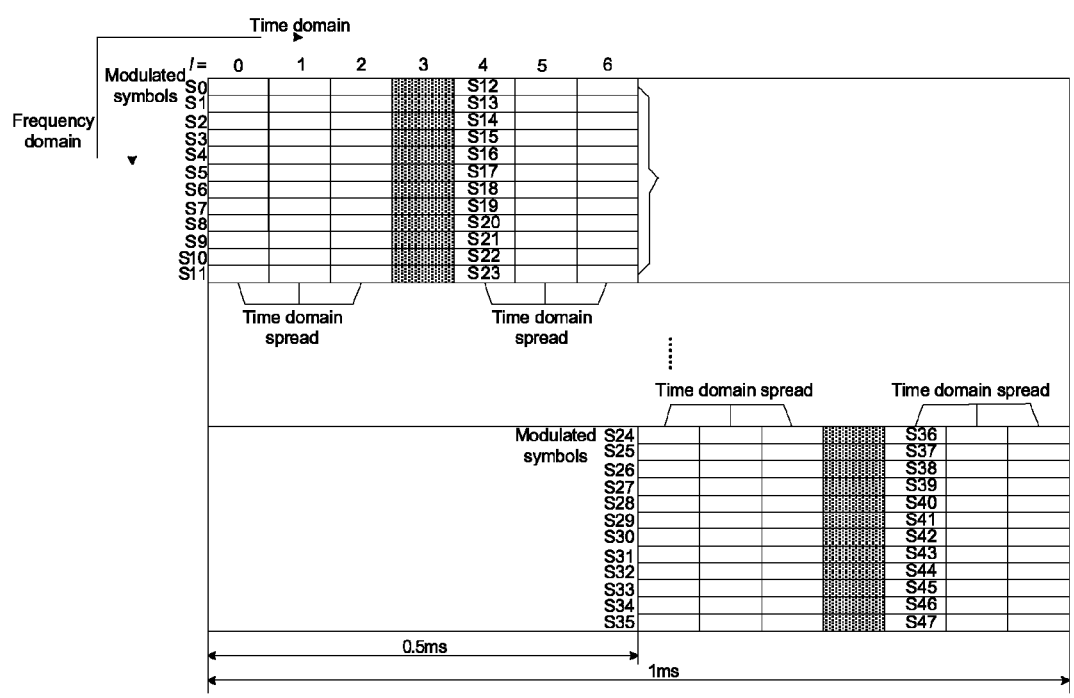
FIG. 6 is a schematic diagram of a channel structure of an enhanced PUCCH format a under the conventional cyclic prefix.

As shown in FIG. 6, under the conventional CP, the uplink control information is transmitted by using the enhanced PUCCH format a. The encoding process is as shown in FIG. 4(*d*). That is, P=4, the ACK/NACK response information bit sequence $\{o_0^{ACK}, o_1^{ACK}, \ldots, o_M^{ACK}\}$ and the CSI bit sequence $\{o_0^{CSI}, o_1^{CSI}, \ldots, o_N^{CSI}\}$ are cascaded and then equally divided into 4 sequences. The lengths of the 4 sequences are $O_1 = \lceil (M+N)/4 \rceil$, $O_2 = \lceil ((M+N)-O_1)/3 \rceil$, $O_3 = \lceil ((M+N)-O_1-O_2)/2 \rceil$ and $O_4 = (M+N)-O_1-O_2-O_3$ respectively. Since the length of the encoded bit sequence that can be born under the enhanced PUCCH format a is 98, each sequence is encoded by using RM (24, O), wherein the RM (24, O) is obtained by performing rate matching on the RM (32, O).

Example 5

Figure 7:
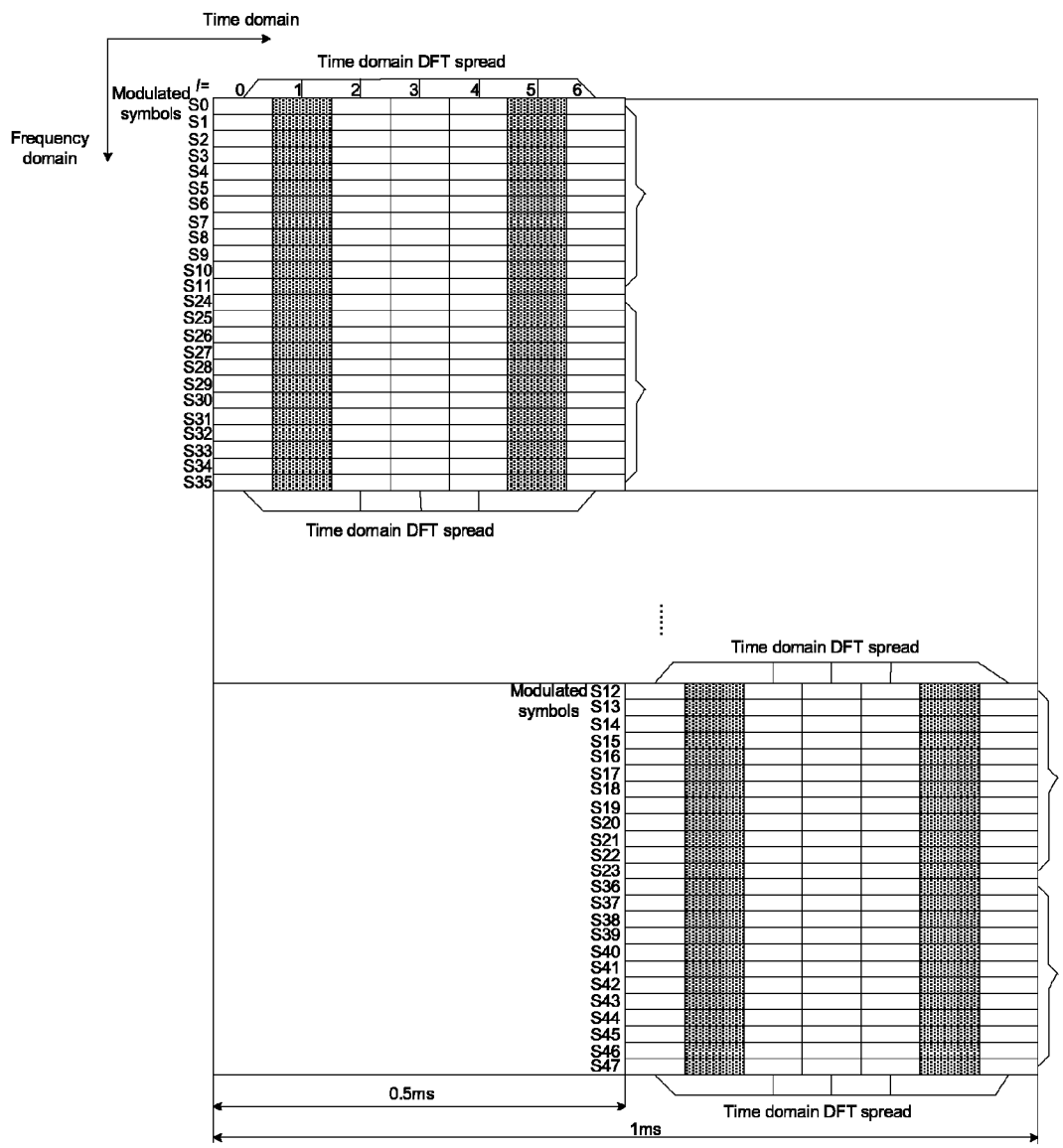
FIG. 7 is a schematic diagram of a channel structure of an enhanced PUCCH format b under the conventional cyclic prefix.

As shown in FIG. 7, the uplink control information is transmitted by using the enhanced PUCCH format b. The encoding process is as shown in FIG. 4(*d*). That is, P=4, the ACK/NACK response information bit sequence $\{o_0^{ACK}, o_1^{ACK}, \ldots, o_M^{ACK}\}$ and the CSI bit sequence $\{o_0^{CSI}, o_1^{CSI}, \ldots, o_N^{CSI}\}$ are cascaded and then equally divided into 4 sequences. The lengths of the 4 sequences are $O_1 = \lceil (M+N)/4 \rceil$, $O_2 = \lceil ((M+N)-O_1)/3 \rceil$, $O_3 = \lceil ((M+N)-O_1-O_2)/2 \rceil$ and $O_4 = (M+N)-O_1-O_2-O_3$ respectively. Since the length of the encoded bit sequence that can be born under the enhanced PUCCH format b is 98, each sequence is encoded by using RM (24, O), wherein the RM (24, O) is obtained by performing rate matching on the RM (32, O).

Way II: The ACK/NACK response information bit sequence $\{o_0^{ACK}, o_1^{ACK}, \ldots, o_M^{ACK}\}$ is taken as an input of P–Q RM (L, O), and the CSI bit sequence $\{o_0^{CSI}, o_1^{CSI}, \ldots, o_N^{CSI}\}$ is taken as an input of Q RM (L, O).

Example 1

As shown in FIG. 5, under the conventional CP, the uplink control information is transmitted by using the PUCCH format 3. The encoding process is as shown in FIG. 4(*b*). That is, P=2, preset Q=1, the ACK/NACK response information bit sequence $\{o_0^{ACK}, o_1^{ACK}, \ldots, o_M^{ACK}\}$ and the CSI bit sequence $\{o_0^{CSI}, o_1^{CSI}, \ldots, o_N^{CSI}\}$ are taken as an input of 2 RM codes respectively. Since the length of the encoded bit sequence that can be born under the PUCCH format 3 is 48, it is encoded by using RM (24, O), wherein the RM (24, O) is obtained by performing rate matching on the RM (32, O).

Example 2

As shown in FIG. 5, under the conventional CP, the uplink control information is transmitted by using the PUCCH format 3. The encoding process is as shown in FIG. 4(*c*). That is, P=3, preset Q=2, the ACK/NACK response information bit sequence $\{o_0^{ACK}, o_1^{ACK}, \ldots, o_M^{ACK}\}$ is taken as an input of 2 RM codes, and the CSI bit sequence $\{o_0^{CSI}, o_1^{CSI}, \ldots, o_N^{CSI}\}$ is taken as an input of 1 RM. Since the length of the encoded bit sequence that can be born under the enhanced PUCCH format 3 is 48, each sequence is encoded by using RM (16, O), wherein the RM (16, O) is obtained by performing rate matching on the RM (32, O).

Example 3

As shown in FIG. 6, under the conventional CP, the uplink control information is transmitted by using the enhanced PUCCH format a. The encoding process is as shown in FIG. 4(*d*). That is, P=4, preset Q=3, the ACK/NACK response information bit sequence $\{o_0^{ACK}, o_1^{ACK}, \ldots, o_M^{ACK}\}$ is taken as an input of 3 RM codes, and the CSI bit sequence $\{o_0^{CSI}, o_1^{CSI}, \ldots, o_N^{CSI}\}$ is taken as an input of 1 RM code. Since the length of the encoded bit sequence that can be born in the enhanced PUCCH format a is 98, each sequence is encoded by using RM (24, O), wherein the RM (24, O) is obtained by performing rate matching on the RM (32, O).

Example 4

As shown in FIG. 7, under the conventional CP, the uplink control information is transmitted by using the enhanced PUCCH format b. The encoding process is as shown in FIG. 4(*d*). That is, P=4, preset Q=3, the ACK/NACK response information bit sequence $\{o_0^{ACK}, o_1^{ACK}, \ldots, o_M^{ACK}\}$ is taken as an input of 3 RM codes, and the CSI bit sequence $\{o_0^{CSI}, o_1^{CSI}, \ldots, o_N^{CSI}\}$ is taken as an input of 1 RM code. Since the length of the encoded bit sequence that can be born in the enhanced PUCCH format b is 98, each sequence is encoded by using RM (24, O), wherein the RM (24, O) is obtained by performing rate matching on the RM (32, O).

Way III: When the number M of bits of the ACK/NACK response information is greater than the number N of bits of the CSI, the determined uplink control information is transmitted in the Way I; and when the number M of bits of the ACK/NACK response information is less than the number N of bits of the CSI, the determined uplink control information is transmitted in the Way I.

When the determined uplink control information is the ACK/NACK response information, the input sequence of the P RM codes is determined in one of the following ways:

Way I: The ACK/NACK response information bit sequence $\{o_0^{ACK}, o_1^{ACK}, \ldots, o_M^{ACK}\}$ is taken as an input of P RM codes.

Example 1

As shown in FIG. 5, under the conventional CP, the uplink control information is transmitted by using the PUCCH format 3. The encoding process is as shown in FIG. 4(*c*). That is, P=3, the ACK/NACK response information bit sequence $\{o_0^{ACK}, o_1^{ACK}, \ldots, o_M^{ACK}\}$ is taken as an input of 3 RM codes. Since the length of the encoded bit sequence that can be born under the PUCCH format 3 is 48, each sequence is encoded by using RM (16, O), wherein the RM (16, O) is obtained by performing rate matching on the RM (32, O).

Example 2

As shown in FIG. 6, under the conventional CP, the uplink control information is transmitted by using the enhanced PUCCH format a. The encoding process is as shown in FIG. 4(*d*). That is, P=4, the ACK/NACK response information bit sequence $\{o_0^{ACK}, o_1^{ACK}, \ldots, o_M^{ACK}\}$ is taken as an input of 4 RM codes. Since the length of the encoded bit sequence that can be born under the enhanced PUCCH format a is 98, each sequence is encoded by using RM (24, O), wherein the RM (24, O) is obtained by performing rate matching on the RM (32, O).

Example 3

As shown in FIG. 6, under the conventional CP, the uplink control information is transmitted by using the enhanced PUCCH format b. The encoding process is as shown in FIG. 4(*d*). That is, P=4, the ACK/NACK response information bit sequence $\{o_0^{ACK}, o_1^{ACK}, \ldots, o_M^{ACK}\}$ is taken as an input of 4 RM codes. Since the length of the encoded bit sequence that can be born under the enhanced PUCCH format b is 98, each sequence is encoded by using RM (24, O), wherein the RM (24, O) is obtained by performing rate matching on the RM (32, O).

Way II: The ACK/NACK response information bit sequence $\{o_0^{ACK}, o_1^{ACK}, \ldots, o_M^{ACK}\}$ is equally divided into P sequences, and each sequence is taken as an input of a respective one of the P RM codes. The way of equal division may be equal division according to order, and may also be equal division according to parity.

Example 1

As shown in FIG. 5, under the conventional CP, the uplink control information is transmitted by using the PUCCH format 3. The encoding process is as shown in FIG. 4(*c*). That is, P=3, the ACK/NACK response information bit sequence $\{o_0^{ACK}, o_1^{ACK}, \ldots, o_M^{ACK}\}$ is equally divided into 3 sequences. The lengths of the 3 sequences are $O_1=\lceil(M+N)/3\rceil$, $O_2=\lceil((M+N)-O_1)/2\rceil$ and $O_3=(M+N)-O_1-O_2$ respectively. Each sequence is taken as an input of a respective one of the P RM codes. Since the length of the encoded bit sequence that can be born under the PUCCH format 3 is 48, each sequence is encoded by using RM (16, O), wherein the RM (16, O) is obtained by performing rate matching on the RM (32, O).

Example 2

As shown in FIG. 6, under the conventional CP, the uplink control information is transmitted by using the enhanced PUCCH format a. The encoding process is as shown in FIG. 4(*d*). That is, P=4, the ACK/NACK response information bit sequence $\{o_0^{ACK}, o_1^{ACK}, \ldots, o_M^{ACK}\}$ is equally divided into 4 sequences. The lengths of the 4 sequences are $O_1=\lceil(M+N)/4\rceil$, $O_2=\lceil((M+N)-O_1)/3\rceil$, $O_3=\lceil((M+N)-O_1-O_2)/2\rceil$ and $O_4=(M+N)-O_1-O_2-O_3$ respectively. Since the length of the encoded bit sequence that can be born under the enhanced PUCCH format a is 98, each sequence is encoded by using RM (24, O), wherein the RM (24, O) is obtained by performing rate matching on the RM (32, O).

Example 3

As shown in FIG. 7, under the conventional CP, the uplink control information is transmitted by using the enhanced PUCCH format b. The encoding process is as shown in FIG. 4(*d*). That is, P=4, the ACK/NACK response information bit sequence $\{o_0^{ACK}, o_1^{ACK}, \ldots, o_M^{ACK}\}$ is equally divided into 4 sequences. The lengths of the 4 sequences are $O_1=\lceil(M+N)/4\rceil$, $O_2=\lceil((M+N)-O_1)/3\rceil$, $O_3=\lceil((M+N)-O_1-O_2)/2\rceil$ and $O_4=(M+N)-O_1-O_2-O_3$ respectively. Since the length of the encoded bit sequence that can be born under the enhanced PUCCH format b is 98, each sequence is encoded by using RM (24, O), wherein the RM (24, O) is obtained by performing rate matching on the RM (32, O).

Way III: H pieces of ACK/NACK response information $\{o_0^{PACK}, o_1^{PACK}, \ldots, o_H^{PACK}\}$ corresponding to a PDSCH and/or a PDCCH used for indicating SPS release and/or an SPS PDSCH on a Pcell is taken as an input of Z RM (L, O), and the remaining M-H pieces of ACK/NACK response information is taken as an input of P-Z RM codes by using the Way I or the Way II.

Example 1

As shown in FIG. 5, under the conventional CP, the uplink control information is transmitted by using the PUCCH format 3. The encoding process is as shown in FIG. 4(*c*). That is, P=3, Z=1, the ACK/NACK response information bit sequence $\{o_0^{PACK}, o_1^{PACK}, \ldots, o_H^{PACK}\}$ corresponding to the Pcell is taken as an input of 1 RM (L, O). The remaining bit sequence is taken as an input of the remaining 2 RM codes (L, O). Each sequence is taken as an input of a respective one of the P RM codes. Since the length of the encoded bit sequence that can be born under the PUCCH format 3 is 48, each sequence is encoded by using RM (16, O), wherein the RM (16, O) is obtained by performing rate matching on the RM (32, O).

Example 2

As shown in FIG. 5, under the conventional CP, the uplink control information is transmitted by using the PUCCH format 3. The encoding process is as shown in FIG. 4(*c*). That is, P=3, Z=1, the ACK/NACK response information bit sequence $\{o_0^{PACK}, o_1^{PACK}, \ldots, o_H^{PACK}\}$ corresponding to the Pcell is taken as an input of 1 RM (L, O). The remaining bit sequence is divided into 2 sequences. The lengths of the 2 sequences are $O_1=\lceil(M-H)/2\rceil$ and $O_2=(M-H)-O_1$ respectively. Each sequence is taken as an input of each RM (L, O). Since the length of the encoded bit sequence that can be born under the PUCCH format 3 is 48, each sequence is encoded by using RM (16, O), wherein the RM (16, O) is obtained by performing rate matching on the RM (32, O).

The values of Z and Q above are less than P and are preset. The value of P is a positive integer greater than 1. The specific value of P is relevant to the PUCCH structure. The PUCCH structure decides the length Y of the sequence after P RMs (L, O) are encoded. The length L of the sequence after each RM is encoded is Y/P. The RM (L, O) is obtained by performing rate matching on the RM (32, O), which belongs to the conventional art or the extension of the conventional art. The implementation is only a mathematical transformation, which is simple, so details of the implementation are no longer repeated here.

Figure 9:
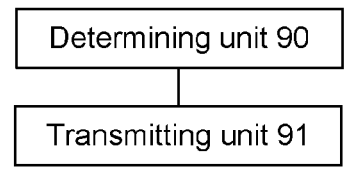
FIG. 9 is a schematic diagram of a composition and structure of a device of uplink control information according to an embodiment of the disclosure.

FIG. 9 is a schematic diagram of a composition and structure of a device of sending uplink control information according to an embodiment of the disclosure. As shown in the figure, the device of sending uplink control information according to the embodiment of the disclosure includes a determining unit 90 and a transmitting unit 91, wherein:

the determining unit 90 is configured to determine, on the basis of high layer signalling and/or a predefined rule, the uplink control information to be transmitted; and the transmitting unit 91 is configured to transmit, via a PUCCH, the determined uplink control information.

In the determining unit 90, the high layer signalling is configured to indicate that the uplink control information to be transmitted is ACK/NACK response information and CSI, or ACK/NACK response information on the basis of the high layer signalling.

The determining unit 90 is further configured to determine the uplink control information to be transmitted on the basis of at least one of the following rules:

Rule I: when the sum of the number of bits of the ACK/NACK response information and the number N of bits of the CSI is greater than or equal to a preset threshold value, it is determined that the uplink control information to be transmitted is the ACK/NACK response information, and when the sum of the number of bits of the ACK/NACK response information and the number N of bits of the CSI is less than the preset threshold value, it is determined that the uplink control information to be transmitted is the ACK/NACK response information and the CSI;

Rule II: when the number of bits of the ACK/NACK response information is greater than the number N of bits of the CSI, it is determined that the uplink control information to be transmitted is the ACK/NACK response information, and when the number of bits of the ACK/NACK response information is less than or equal to the number N of bits of the CSI, it is determined that the uplink control information to be transmitted is the ACK/NACK response information and the CSI;

Rule III: when a ratio of the number of bits of the ACK/NACK response information to the number N of bits of the CSI is greater than or equal to a preset threshold value, it is determined that the uplink control information to be transmitted is the ACK/NACK response information, and when the ratio of the number of bits of the ACK/NACK response information to the number N of bits of the CSI is less than the preset threshold value, it is determined that the uplink control information to be transmitted is the ACK/NACK response information and the CSI;

Rule IV: when the number N of bits of the CSI is greater than or equal to a preset threshold value, it is determined that the uplink control information to be transmitted is the ACK/NACK response information, and when the number N of bits of the CSI is less than the preset threshold value, it is determined that the uplink control information to be transmitted is the ACK/NACK response information and the CSI; and Rule V: when the number of bits of the ACK/NACK response information is greater than or equal to a preset threshold value, it is determined that the uplink control information to be transmitted is the ACK/NACK response information, and when the number of bits of the ACK/NACK response information is less than the preset threshold value, it is determined that the uplink control information to be transmitted is the ACK/NACK response information and the CSI.

The determining unit 90 above is further configured to, when determining, on the basis of an indication of the high layer signalling, that the uplink control information to be transmitted is the ACK/NACK response information and the CSI, determine, on the basis of the predefined rule, whether both the ACK/NACK response information and the CSI are to be transmitted simultaneously or only the ACK/NACK response information is to be transmitted.

The transmitting unit 91 is further configured to transmit, in an encoding way of P RM codes, the determined uplink control information on the PUCCH.

When the determined uplink control information is the ACK/NACK response information and the CSI, the input sequence of the P RM codes is determined in one of the following ways:

Way I: the bits of the ACK/NACK response information and the bits of the CSI are cascaded and then equally divided into P sequences, each sequence being taken as an input of a respective one of the P RM codes;

Way II: the bits of the ACK/NACK response information are taken as an input of P−Q RM codes, and the bits of the CSI are taken as an input of Q RM codes; and Way III: when the number M of bits of the ACK/NACK response information is greater than the number N of bits of the CSI, the determined uplink control information is transmitted in the Way I; and when the number M of bits of the ACK/NACK response information is less than the number N of bits of the CSI, the determined uplink control information is transmitted in the Way II; and when the determined uplink control information is the ACK/NACK response information, the input sequence of the P RM codes is determined in one of the following ways:

Way I: M bits of the ACK/NACK response information are taken as an input of the P RM codes;

Way II: M bits of the ACK/NACK response information are equally divided into P sequences, each sequence being taken as an input of a respective one of the P RM codes; and Way III: H pieces of ACK/NACK response information corresponding to a PDSCH and/or SPS release and/or an SPS PDSCH on a Primary Cell (Pcell) is taken as an input of Z RM codes, and remaining M-H pieces of ACK/NACK response information is equally divided into P−Z sequences, each sequence being taken as an input of a respective one of the P−Z RM codes.

The values of Z and Q above are less than P and preset. The value of P is a positive integer greater than 1. The specific value of P is relevant to the PUCCH structure. The PUCCH structure decides the length Y of the sequence after P RMs (L, O) are encoded. The length L of the sequence after each RM is encoded is Y/P. The RM (L, O) is obtained by performing rate matching on the RM (32, O), which belongs to the conventional art or the extension of the conventional art. The implementation is only a mathematical transformation, which is simple, so details of the implementation are no longer repeated here.

Those skilled in the art should understand that the implementation functions of each processing unit in the device of sending uplink control information shown in FIG. 9 may be understood with reference to the relevant description of the method of sending uplink control information. The functions of each unit in the device of sending uplink control information shown in FIG. 9 may be implemented by programs run on the processor, and may also be implemented by a specific logic circuit. For example, the transmitting unit may be implemented by a transmitting antenna.

The disclosure also discloses a UE, which includes the device for transmitting uplink control information as shown in FIG. 9.

The above are only the preferred embodiments of the disclosure, and are not intended to limit the scope of protection of the claims of the disclosure.

INDUSTRIAL APPLICABILITY

In the disclosure, it is determined, on the basis of the high layer signalling and/or the predefined rule, whether only the ACK/NACK response information in the uplink control information is transmitted or both the ACK/NACK response information and the CSI are transmitted simultaneously, and according to different uplink control information to be transmitted, the uplink control information is transmitted respectively in a different encoding way of RM codes, thereby being capable of ensuring the maximum system throughput and reducing the feedback delay of downlink channel information.

The invention claimed is:

1. A method for transmitting uplink control information, comprising:
   determining, on the basis of high layer signalling and/or a predefined rule, uplink control information to be transmitted; and
   transmitting, on a Physical Uplink Control Channel (PUCCH), the determined uplink control information;
   wherein the determining, on the basis of the predefined rule, the uplink control information to be transmitted comprises: determining, on the basis of at least one of the following rules, the uplink control information to be transmitted:
   Rule I: when a sum of a number of bits of the ACK/NACK response information and a number of bits of the CSI is greater than or equal to a preset threshold value, it is determined that the uplink control information to be transmitted is the ACK/NACK response information, and when the sum of the number of bits of the ACK/NACK response information and the number of bits of the CSI is less than the preset threshold value, it is determined that the uplink control information to be transmitted is the ACK/NACK response information and the CSI;
   Rule II: when the number of bits of the ACK/NACK response information is greater than the number of bits of the CSI, it is determined that the uplink control information to be transmitted is the ACK/NACK response information, and when the number of bits of the ACK/NACK response information is less than or equal to the number of bits of the CSI, it is determined that the uplink control information to be transmitted is the ACK/NACK response information and the CSI;
   Rule III: when a ratio of the number of bits of the ACK/NACK response information to the number of bits of the CSI is greater than or equal to a preset threshold value, it is determined that the uplink control information to be transmitted is the ACK/NACK response information, and when the ratio of the number of bits of the ACK/NACK response information to the number of bits of the CSI is less than the preset threshold value, it is determined that the uplink control information to be transmitted is the ACK/NACK response information and the CSI;
   Rule IV: when the number of bits of the CSI is greater than or equal to a preset threshold value, it is determined that the uplink control information to be transmitted is the ACK/NACK response information, and when the number of bits of the CSI is less than the preset threshold value, it is determined that the uplink control information to be transmitted is the ACK/NACK response information and the CSI; and
   Rule V: when the number of bits of the ACK/NACK response information is greater than or equal to a preset threshold value, it is determined that the uplink control information to be transmitted is the ACK/NACK response information, and when the number of bits of the ACK/NACK response information is less than the preset threshold value, it is determined that the uplink control information to be transmitted is the ACK/NACK response information and the CSI.

2. The method according to claim 1, wherein the determining, on the basis of the high layer signalling, the uplink control information to be transmitted comprises:
   determining the uplink control information to be transmitted as Acknowledgement/Negative-Acknowledgement (ACK/NACK) response information and Channel State Information (CSI), when the high layer signalling indicates that the uplink control information to be transmitted is ACK/NACK response information and CSI, or
   determining the uplink control information to be transmitted as ACK/NACK response information, when the high layer signalling indicates that the uplink control information to be transmitted is the ACK/NACK response information.

3. The method according to claim 1, wherein the determining, on the basis of the high layer signalling and the predefined rule, uplink control information to be transmitted comprises:
   when it is determined, on the basis of an indication of the high layer signalling, that the uplink control information to be transmitted is the ACK/NACK response information and the CSI, further determining, on the basis of the predefined rule, whether both the ACK/NACK response information and the CSI are to be transmitted simultaneously or only the ACK/NACK response information is to be transmitted.

4. The method according to claim 1, wherein the transmitting, on the PUCCH, the determined uplink control information comprises:
   encoding the determined uplink control information to be transmitted on the PUCCH by a number P of Reed-Muller (RM) codes; and
   transmitting the encoded uplink control information on the PUCCH.

5. The method according to claim 4, wherein the transmitting the encoded uplink control information on the PUCCH comprises:
   when the determined uplink control information is the ACK/NACK response information and the CSI, determining an input sequence of the P RM codes in one of the following ways:
   Way I: cascading and equally dividing the bits of the ACK/NACK response information and the bits of the CSI into P sequences, each sequence being taken as an input of a respective one of the P RM codes;
   Way II: taking the bits of the ACK/NACK response information as an input of P minus Q (P−Q) RM codes, and the bits of the CSI as an input of Q RM codes; and
   Way III: when the number of bits of the ACK/NACK response information is greater than the number of bits of the CSI, transmitting the determined uplink control information in the Way I; and when the number of bits of the ACK/NACK response information is less than the number of bits of the CSI, transmitting the determined uplink control information in the Way II.

6. The method according to claim 4, wherein the transmitting the encoded uplink control information on the PUCCH comprises:
   when the determined uplink control information is the ACK/NACK response information, determining an input sequence of the P RM codes in one of the following ways:
   Way I: taking the bits of the ACK/NACK response information as an input of the P RM codes;
   Way II: equally dividing the bits of the ACK/NACK response information into P sequences, each sequence being taken as an input of a respective one of the P RM codes; and Way III: taking ACK/NACK response information corresponding to a Physical Downlink Shared Channel (PDSCH) and/or Semi-Persistent Scheduling (SPS) release and/or an SPS PDSCH on a Primary Cell (Pcell) as an input of Z RM codes, and equally dividing remaining ACK/NACK response information into P minus Z (P–Z) sequences, each sequence being taken as an input of a respective one of the P–Z RM codes.

7. The method according to claim 4, wherein P is a positive integer greater than 1, and Z and Q are less than P and are preset values.

8. A device for transmitting uplink control information, comprising:
   a memory for storing instructions; and
   a processor coupled with the memory for implementing the instructions;
   the processor is configured to determine, on the basis of high layer signalling and/or a predefined rule, uplink control information to be transmitted; and transmit, on a Physical Uplink Control Channel (PUCCH), the determined uplink control information;
   wherein the processor is further configured to determine the uplink control information to be transmitted on the basis of at least one of the following rules:
   Rule I: when a sum of the number of bits of the ACK/NACK response information and the number of bits of the CSI is greater than or equal to a preset threshold value, it is determined that the uplink control information to be transmitted is the ACK/NACK response information, and when the sum of the number of bits of the ACK/NACK response information and the number of bits of the CSI is less than the preset threshold value, it is determined that the uplink control information to be transmitted is the ACK/NACK response information and the CSI;
   Rule II: when the number of bits of the ACK/NACK response information is greater than the number of bits of the CSI, it is determined that the uplink control information to be transmitted is the ACK/NACK response information, and when the number of bits of the ACK/NACK response information is less than or equal to the number of bits of the CSI, it is determined that the uplink control information to be transmitted is the ACK/NACK response information and the CSI;
   Rule III: when a ratio of the number of bits of the ACK/NACK response information to the number of bits of the CSI is greater than or equal to a preset threshold value, it is determined that the uplink control information to be transmitted is the ACK/NACK response information, and when the ratio of the number of bits of the ACK/NACK response information to the number of bits of the CSI is less than the preset threshold value, it is determined that the uplink control information to be transmitted is the ACK/NACK response information and the CSI;
   Rule IV: when the number of bits of the CSI is greater than or equal to a preset threshold value, it is determined that the uplink control information to be transmitted is the ACK/NACK response information, and when the number of bits of the CSI is less than the preset threshold value, it is determined that the uplink control information to be transmitted is the ACK/NACK response information and the CSI; and
   Rule V: when the number of bits of the ACK/NACK response information is greater than or equal to a preset threshold value, it is determined that the uplink control information to be transmitted is the ACK/NACK response information, and when the number of bits of the ACK/NACK response information is less than the preset threshold value, it is determined that the uplink control information to be transmitted is the ACK/NACK response information and the CSI.

9. The device according to claim 8, wherein the high layer signalling is configured to indicate that the uplink control information to be transmitted is Acknowledgement/Negative-Acknowledgement (ACK/NACK) response information and Channel State Information (CSI), or the ACK/NACK response information.

10. The device according to claim 8, wherein the processor is further configured to, when determining, on the basis of an indication of the high layer signalling, that the uplink control information to be transmitted is the ACK/NACK response information and the CSI, determine, on the basis of the predefined rule, whether both the ACK/NACK response information and the CSI are to be transmitted simultaneously or only the ACK/NACK response information is to be transmitted.

11. The device according to claim 8, wherein the processor is further configured to transmit, on the PUCCH, the determined uplink control information which is encoded by Reed Muller (RM) codes.

12. The device according to claim 11, wherein the processor is further configured to transmit the determined uplink control information which is encoded by RM codes:
   when the determined uplink control information is the ACK/NACK response information and the CSI, an input sequence of the P RM codes is determined in one of the following ways:
      Way I: the bits of the ACK/NACK response information and the bits of the CSI are cascaded and then equally divided into P sequences, each sequence being taken as an input of a respective one of the P RM codes;
      Way II: the bits of the ACK/NACK response information are taken as an input of P minus Q (P–Q) RM codes, and the bits of the CSI are taken as an input of Q RM codes; and
      Way III: when the number of bits of the ACK/NACK response information is greater than the number of bits of the CSI, the determined uplink control information is transmitted in the Way I; and when the number of bits of the ACK/NACK response information is less than the number of bits of the CSI, the determined uplink control information is transmitted in the Way II; and
   when the determined uplink control information is the ACK/NACK response information, an input sequence of the P RM codes is determined in one of the following ways:
      Way I: the bits of the ACK/NACK response information are taken as an input of the P RM codes;
      Way II: the bits of the ACK/NACK response information are equally divided into P sequences, each sequence being taken as an input of a respective one of the P RM codes; and
      Way III: ACK/NACK response information corresponding to a PDSCH and/or Semi-Persistent Scheduling (SPS) release and/or an SPS PDSCH on a Primary Cell (Pcell) is taken as an input of Z RM codes, and the remaining ACK/NACK response information is equally divided into P minus Q (P–Q) sequences, each sequence being taken as an input of a respective one of the P–Z RM codes.

13. The device according to claim 12, wherein P is a positive integer greater than 1, and Z and Q are less than P and are preset values.

14. A User Equipment (UE), comprising the device for transmitting uplink control information according to claim 8.

\* \* \* \* \*